C. L. C. MAGEE.
WAGON LIFTING APPARATUS.
APPLICATION FILED MAY 20, 1920.
1,397,593.
Patented Nov. 22, 1921.
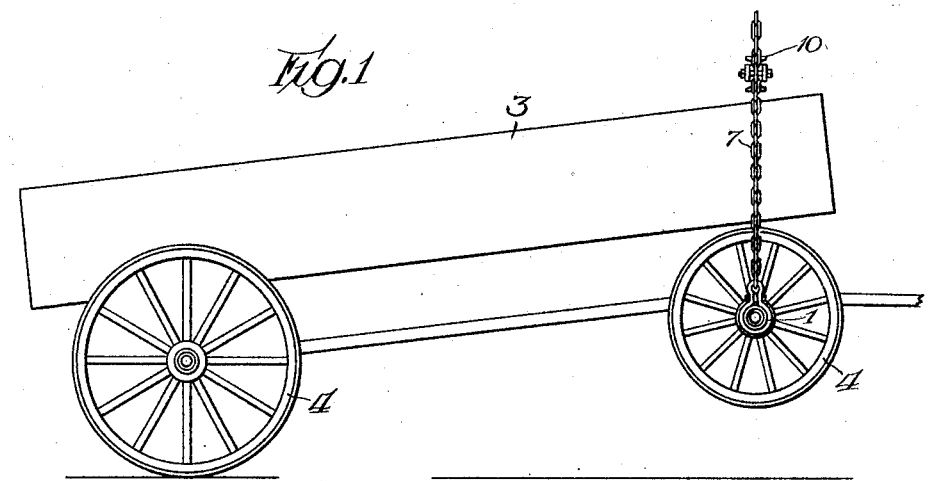
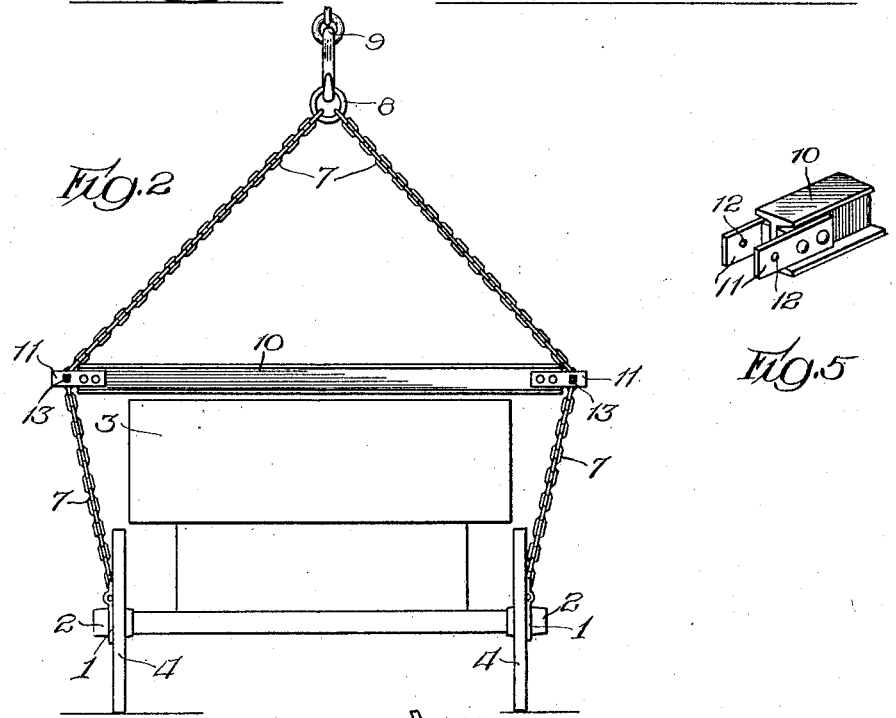
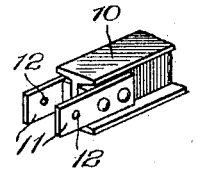
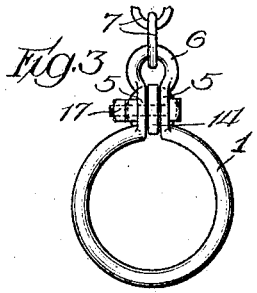
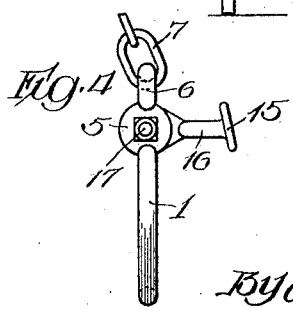
Inventor
C.L.C. Magee
By Arthur F. Durand
Atty.

UNITED STATES PATENT OFFICE.

CHAUNCEY L. C. MAGEE, OF CHICAGO, ILLINOIS.

WAGON-LIFTING APPARATUS.

1,397,593.  Specification of Letters Patent.  Patented Nov. 22, 1921.

Application filed May 20, 1920. Serial No. 382,881.

*To all whom it may concern:*

Be it known that I, CHAUNCEY L. C. MAGEE, a citizen of the United States of America, and a resident of Chicago, Illinois, have invented a certain new and useful Improvement in Wagon-Lifting Apparatus, of which the following is a specification.

This invention relates to apparatus for lifting wagons or other vehicles for various purposes. For example, in connection with certain kinds of work, such as the beet sugar industry, it is desirable to tilt a wagon up at its front end to allow the beets to slide out of the rear end. There are also other situations that require the lifting of a wagon or other vehicle.

Generally stated, the object of the invention is, therefore, to provide a simple and inexpensive and reliable apparatus for connection to the wheels of a wagon or other vehicle to raise the latter into the desired position.

It is also an object to provide certain details and features of construction tending to increase the general efficiency and the desirability of a lifting apparatus of this particular character.

To these and other useful ends the invention consists in matters hereinafter set forth and claimed, and shown in the accompanying drawings, in which—

Figure 1 is a side elevation of a wagon equipped temporarily with lifting apparatus embodying the principles of the invention.

Fig. 2 is a front elevation of said wagon and apparatus.

Figs. 3, 4 and 5 are detail views.

As thus illustrated, the invention comprises a pair of rings 1 adapted to encircle the hubs 2 of the front wheels of the wagon, which latter has a box or body 3 and rear wheels 4 of the ordinary character. Said rings 1 have upstanding portions 5 which are joined by an eye 6, the portions 5 being flat and spaced apart a distance. The chains 7 constitute lifting connections and are attached at their lower ends to the eyes 6, and at their upper ends to the ring 8 of the connection 9 which is of any suitable character. To keep the chains 7 out of contact with the wagon, and to insure the desired clearance in other ways, a spreader comprising a bar or I-shaped beam 10 is provided and interposed between the two chains. Said spreader has a pair of cheek plates 11 at each end thereof, to embrace the chain, and these plates have holes 12 for the bolts 13 which are inserted through links of the chains. This spreads the chains away from the wagon, and necessitates some provision to keep the rings 1 from slipping off the hubs of the wheels. Preferably, therefore, anchors comprising flat portions 14 and inclined heads 15 on stems or necks 16 are held in place by bolts 17 inserted through said flat portions and the upstanding portions 5 of the rings 1 previously described. Thus the flat portions 14 of these anchors are pivoted between the portions 5, so that each anchor can swing up and down. When the hub engaging devices thus constructed are applied, the said anchors are raised a little and then swung down between the spokes, so that the heads 15 will engage the inner sides of the spokes, the heads being formed in a suitable manner for this purpose. In this way the rings 1 are detachably held in place on the hubs of the wheels.

When the apparatus is operated by any suitable hoisting machinery, (not shown) the strain is on the hubs of the wheels, and the latter serve as swivels between the lifting connections and the wagon, so that not only will the wheels be safe against injury, but whereby also the wagon will tilt freely about a transverse axis at the lower ends of the chains 7 which constitute the lifting connections. The load of beets or other materials will slide out of the rear end of the wagon, and then the front end can be quickly lowered and easily disconnected from the apparatus (by raising the anchor heads 15 out of engagement with the spokes) and the next wagon can be tilted and dumped in the same way.

The lifting apparatus thus constructed imposes the strain where it belongs—that is to say, on the links and axle of the wagon, substantially as would be the case if the wagon rested on the ground. While the apparatus is shown as applied to only the front end of the wagon, it will be understood that it can be applied to either end, or to both ends if necessary or desirable. The apparatus could be hooked onto the tops of the wheels, of course, to impose the strain on the axle, but this would be liable to break the wheels, and hence it is preferable to connect the apparatus to the hubs, thus avoiding any strain on the rims of the wheels, and very little strain on the spokes, as the latter are only subjected to a slight strain by the anchors which hold the rings on the hubs.

The connections 7, it will be seen, extend downward outside the wheels, which means, of course, that the wheel-rims are inside these connections, whereby the rings 1 will slip off if not held on the hubs in the manner explained.

What I claim as my invention is:—

1. In apparatus for lifting a wagon or other wheeled vehicle, the combination of lifting connections, means to support said connections outside of the wheels at opposite sides of the vehicle, and devices on the lower ends of said connections to detachably engage the hubs outside of the spokes of the wheels, and to prevent disconnection from the hubs while the lifting strain is on said connections.

2. Apparatus as specified in claim 1, said devices comprising rings forming means to encircle the hubs.

3. Apparatus as specified in claim 1, said devices comprising means to enter between and engage the inner sides of the spokes of the wheels.

4. Apparatus as specified in claim 1, in combination with a member to spread said connections outwardly and away from the wheels, said devices having means to enter between and engage the inner sides of the spokes of the wheels.

5. Apparatus as specified in claim 1, said devices each comprising a ring to encircle the hub, having upstanding portions for attachment to said connections, and an anchor pivoted between said portions to enter between and engage the inner sides of the spokes of the wheels.

6. In apparatus for lifting the front end of a wagon or other wheeled vehicle, to dump the load from the rear end thereof, the combination of lifting connections, depending outside of the wheels at opposite sides of the vehicle, and means to convert the hubs of the front wheels into swivels for the lower ends of said connections, whereby the lifting strain is on said hubs, having provision whereby the spokes of the wheels serve to prevent displacement of the hubs from said means.

7. A structure as specified in claim 6 said provisions serving to prevent rotation of the wheels relatively to said lifting connections.

8. A structure as specified in claim 6, in combination with means to spread said connections away from the wagon.

9. A structure as specified in claim 6, said provisions comprising means to engage the spokes near the hubs.

10. A wheel lifting device comprising a ring to encircle the hub of the wheel, means to engage the spokes of the wheel, so that said device will be prevented from slipping off the hub, and a connection extending downward outside of the wheel to said ring.

11. A structure as specified in claim 10, said means being a pivoted element to enter between and engage the inner sides of the spokes.

12. In apparatus for lifting a wagon or other wheeled vehicle, the combination of lifting connections, means to support said connections at opposite sides of the vehicle, and devices on the lower ends of said connections to engage the hubs of the wheels, said devices each comprising a ring to encircle the hub, having upstanding portions for attachment to said connections, and an anchor pivoted between said portions to enter between and engage the inner sides of the spokes of the wheels.

13. A wheel lifting device comprising a ring to encircle the hub of the wheel, and means to engage the spokes of the wheel, so that said devices will be prevented from slipping off the hub, said means being a pivoted element to enter between and engage the inner sides of the spokes.

CHAUNCEY L. C. MAGEE.